(12) United States Patent
Karasawa

(10) Patent No.: US 12,180,927 B2
(45) Date of Patent: Dec. 31, 2024

(54) CONTAINERIZED MOBILE WIND POWER GENERATION APPARATUS

(71) Applicant: NTN CORPORATION, Osaka (JP)

(72) Inventor: Ryosuke Karasawa, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/121,341

(22) Filed: Mar. 14, 2023

(65) Prior Publication Data

US 2023/0213019 A1    Jul. 6, 2023

Related U.S. Application Data

(63) Continuation of application No. PCT/JP2021/034621, filed on Sep. 21, 2021.

(30) Foreign Application Priority Data

Sep. 28, 2020   (JP) ................. 2020-162167

(51) Int. Cl.
| | | |
|---|---|---|
| *F03D 13/00* | (2016.01) | |
| *F03D 9/25* | (2016.01) | |
| *F03D 13/20* | (2016.01) | |

(52) U.S. Cl.
CPC .............. *F03D 13/20* (2016.05); *F03D 9/25* (2016.05); *F05B 2240/142* (2013.01); *F05B 2240/214* (2013.01); *F05B 2240/915* (2013.01)

(58) Field of Classification Search
CPC ........ F03D 13/20; F03D 9/25; F03D 13/2005; F05B 2240/142; F05B 2240/214;
(Continued)

(56) References Cited

U.S. PATENT DOCUMENTS

| | | |
|---|---|---|
| 9,221,136 B2 | 12/2015 | Ansari |
| 9,780,720 B2 | 10/2017 | Ansari |
| (Continued) | | |

FOREIGN PATENT DOCUMENTS

| | | |
|---|---|---|
| CN | 201228615 Y | 4/2009 |
| DE | 3405466 A1 | 8/1985 |
| (Continued) | | |

OTHER PUBLICATIONS

International Search Report issued in International Application No. PCT/JP2021/034621 dated Nov. 16, 2021.

*Primary Examiner* — Julio C. Gonzalez

(57) ABSTRACT

A linear-motion guiding device is disposed on the wall of the container. The wind turbine includes, at the lower end of the support column, a support-column lower end member capable of being fixed to the linear-motion guiding device. A slider of the linear-motion guiding device is provided with a guide member, and a bolt is inserted through a bolt insertion hole in the support-column lower end member and is screwed into a threaded hole in the guide member. The apparatus includes an attachment guide part including a stepped bolt and a flanged step part, the attachment guide part being configured to guide the support-column lower end member to a position and an attitude in which the bolt insertion hole in the support-column lower end member is aligned with the threaded hole in the guide member when the support-column lower end member is not fixed to the slider.

5 Claims, 8 Drawing Sheets

(58) Field of Classification Search
CPC ....... F05B 2240/915; F05B 2240/9151; Y02E 10/728; Y02E 10/74
See application file for complete search history.

(56) References Cited

U.S. PATENT DOCUMENTS

| | | |
|---|---|---|
| 10,367,442 B2 | 7/2019 | Ansari |
| 10,711,476 B2 | 7/2020 | Ansari |
| 11,592,004 B2 | 2/2023 | Karasawa et al. |
| 2006/0260672 A1 | 11/2006 | Niederer |
| 2010/0032955 A1* | 2/2010 | Chen ........................ F03D 9/11 290/55 |
| 2011/0027100 A1* | 2/2011 | Cummane ............... F03D 13/22 29/889 |
| 2014/0231284 A1 | 8/2014 | Ansari |
| 2016/0036375 A1 | 2/2016 | Ansari |
| 2018/0358919 A1 | 12/2018 | Ansari |
| 2019/0100934 A1 | 4/2019 | Ansari |
| 2019/0326846 A1 | 10/2019 | Ansari et al. |
| 2021/0222676 A1 | 7/2021 | Karasawa et al. |

FOREIGN PATENT DOCUMENTS

| | | | |
|---|---|---|---|
| JP | 2000-097145 A | 4/2000 | |
| JP | 2020-060113 | 4/2020 | |
| WO | WO 2017/066669 A | 4/2017 | |
| WO | WO-2020075617 A1 * | 4/2020 | ............. B65D 88/12 |

\* cited by examiner

CONTAINERIZED MOBILE WIND POWER GENERATION APPARATUS

CROSS REFERENCE TO THE RELATED APPLICATION

This application is a continuation application, under 35 U.S.C. § 111(a), of international application No. PCT/JP2021/034621, filed Sep. 21, 2021, which is based on and claims Convention priority to Japanese patent application No. 2020-162167, filed Sep. 28, 2020, the entire disclosures of all of which are herein incorporated by reference as a part of this application.

BACKGROUND OF THE INVENTION

Field of the Invention

The present invention relates to a containerized mobile wind power generation apparatus that can be moved with a wind turbine housed in a container and to a containerized mobile wind power generation apparatus that can be easily installed and easily fixed as a power supply source in unelectrified areas as well as disaster-affected areas or the like.

Description of Related Art

Ease of transport, ease of installation, and power generation capacity are important requirements for a power source system for supplying power in unelectrified areas and disaster-affected areas or the like. As a wind power generation device that meets such requirements, a containerized mobile wind power generation apparatus has been proposed which can be moved with a vertical wind turbine housed in a shipping container of standard dimensions (for example, Patent Document 1).

RELATED DOCUMENT

Patent Document

[Patent Document 1] JP Laid-open Patent Publication No. 2020-60113

SUMMARY OF THE INVENTION

The containerized mobile wind power generation apparatus of Patent Document 1 is excellent in terms of ease of transport, ease of installation, as well as power generation capacity. In order to further enhance ease of installation of such a wind power generation apparatus, a non-published proposed example as shown in FIG. 10 is provided, in which a linear-motion guiding device 111 is disposed on the wall of the container 101, and the lower end of the support column 106 of the wind turbine 102 is attached to a vertically movable slider of the linear-motion guiding device 111. In this proposed example, to attach the wind turbine 102 to the linear-motion guiding device 111, the wind turbine 102 is brought to the attachment position by using a manual lift 140 or the like as shown in FIG. 11.

As shown in the exploded perspective view of FIG. 12, in order to attach the lower end of the support column 106 of the wind turbine 102 to the slider 112 of the linear-motion guiding device 111, the support column 106 is provided with a support-column lower end member 110 at the lower end thereof, and bolts (not illustrated) are inserted through the bolt insertion holes 118 in the support-column lower end member 110 and then are fastened to the threaded holes 117 in the slider 112 to fix the lower end of the support column to the slider.

However, when the wind turbine is to be fixed to the slider 112 of the linear-motion guiding device 111 with bolts, in some cases, it may take time to attach the wind turbine if the wind turbine 102 is inclined due to unevenness of the ground or the like, and thus the bolt insertion holes 118 do not come into alignment with the threaded holes 117. In addition, when the wind turbine 102 is to be fixed to the container 101 with bolts in order to enhance fixation after the wind turbine 102 is fixed to the linear-motion guiding device 111 with bolts and is brought up by using the manual lift 140 or the like, in some cases, it may take time to attach the wind turbine if the holes in wind turbine 102 do not come into alignment with the holes in the container 101.

An object of the present invention is to provide a containerized mobile wind power generation apparatus that is excellent in terms of ease of transport and ease of installation, in particular, is further enhanced in terms of ease of installation in that it is possible to eliminate the time required for attachment due to misalignment with the threaded hole when the lower end of the support column of the wind turbine is to be fixed to the slider of the linear-motion guiding device with a bolt.

The present invention provides a containerized mobile wind power generation apparatus including:

a container;

a wind turbine capable of being housed in the container; and a generator configured to be driven by the wind turbine to generate power, wherein the containerized mobile wind power generation apparatus further includes a linear-motion guiding device on a wall of the container, the linear-motion guiding device including a slider which is vertically movable.

The wind turbine includes a rotary blade assembly which is disposed at an upper end of a support column, and a support-column lower end member which is disposed at a lower end of the support column and can be fixed to the slider, and the wind turbine can be moved vertically along with the slider when the support-column lower end member is fixed to the slider.

The slider is provided with a guide member, and the wind turbine can be fixed to the slider by inserting a bolt through a bolt insertion hole in the support-column lower end member and screwing the bolt into a threaded hole in the guide member.

The containerized mobile wind power generation apparatus includes an attachment guide part configured to guide the support-column lower end member to a position and an attitude in which the bolt insertion hole in the support-column lower end member is aligned with the threaded hole in the guide member when the support-column lower end member is not fixed to the slider.

According to this configuration, the wind turbine of the wind power generator housed in the container can be set up more easily, so that power demand can be immediately met even in areas affected by disasters or the like. This containerized mobile wind power generation apparatus includes a linear-motion guiding device disposed on a wall of the container, the linear-motion guiding device including a slider which is vertically movable. And the wind turbine includes, at a lower end of the support column, a support-column lower end member which can be fixed to the slider, the wind turbine can be moved vertically along with the slider when the support-column lower end member is fixed to the slider, and the wind turbine can be fixed to the slider by inserting a bolt through a bolt insertion hole in the support-column lower end member and screwing the bolt into a threaded hole in the guide member. Thus, installation operation is facilitated.

In particular, since the containerized mobile wind power generation apparatus includes the attachment guide part configured to guide the support-column lower end member to a position and an attitude in which the bolt insertion hole in the support-column lower end member is aligned with the threaded hole in the guide member when the support-column lower end member is not fixed to the slider, the support-column lower end member of the wind turbine is guided by the attachment guide part such that the bolt insertion hole in the support-column lower end member is aligned with the threaded hole in the slider, when the wind turbine is to be fixed by a bolt to the threaded hole in the linear-motion guiding device. Thus, installation can be further facilitated in that it is possible to eliminate the time required for attachment due to misalignment with the threaded hole. Also in the case where the wind turbine guided by the linear-motion guiding device to the upper part of the container is to be fastened to the container with a bolt so as to be maintained at this position, the wind turbine assumes an upright attitude at the attachment guide part, so that alignment with the threaded hole can be easily attained even at this position, making it very easy to fix the wind turbine with a bolt.

In the present invention, the attachment guide part may include: a stepped bolt including a shaft part and a head part having a larger diameter than that of the shaft part; a hook slot provided in the support-column lower end member, the hook slot having, in a lower part thereof, a large diameter part through which the head part of the stepped bolt can pass and, in an upper part thereof, a narrow part having a width that permits the shaft part of the stepped bolt to pass through but does not permit the head part to pass through; and a flanged step part including a receiving part configured to receive a lower face of the support-column lower end member and a flange part extending upward from an end of the receiving part opposite from the container so as to engage with a side face of the support-column lower end member opposite from the container.

As long as the attachment guide part can guide the support-column lower end member to a position and an attitude in which the bolt insertion hole in the support-column lower end member is aligned with the threaded hole in the guide member when the support-column lower end member is not fixed to the slider, the attachment guide part may have various forms. However, the attachment guide part including a stepped bolt, a hook slot, and a flanged step part as described above has a simple configuration and is excellent in operability. Stated another way, in order to make the column part of the wind turbine upright with respect to the container regardless of unevenness of the ground, the wind turbine could be positioned using a guide pin in an example. In such a case, however, it is difficult to bring the heavy wind turbine that is not upright into alignment and engagement aligning with a guide pin, and it is also difficult to hold the wind turbine in the engaged state. In contrast, in the case where the attachment guide part includes the stepped bolt and the hook slot as well as the flanged step part, the structure including the stepped bolt and the flanged step part configured to receive the wind turbine requires only that the wind turbine be brought into engagement with the stepped bolt, so that the wind turbine can be hooked on the stepped bolt under its own weight and be stably held temporarily. Therefore, the operation can be performed safely. As used herein, the "stepped bolt" may have a form including a head part, a male thread and a non-threaded shaft part between the head part and the male thread or, simply, a form including a shaft part that is threaded entirely and a head part having a larger diameter than that of the shaft part.

In the present invention, the wind turbine may be a vertical wind turbine including a central rotary member disposed so as to be rotatable about a vertical axis and a plurality of blades extending vertically around the central rotary member. In the case where the wind turbine is a vertical wind turbine, the wind turbine can rotate without being affected by the wind direction, can rotate even in light wind, and is also excellent in noise reduction performance.

In the present invention, the containerized mobile wind power generation apparatus may include upper and lower to-be-engaged parts in an upper part of the container and a lower part of the support column of the wind turbine, respectively, and a winder including upper and lower hook parts configured to be engaged with the upper and lower to-be-engaged parts, respectively, and change a distance between the upper and lower hook parts. In the case where the containerized mobile wind power generation apparatus includes a winder in combination with a linear-motion guiding device, the operations to lift and lower the wind turbine can be facilitated when the wind turbine is lifted to the upper part of the container to be set up on the container and when the wind turbine is lowered from the upper part of container to be housed therein. The configuration in which the to-be-engaged parts are provided at the upper part of the container and the lower part of the support column of the wind turbine, and the upper and lower to-be-engaged parts are configured to be engaged with the upper and lower hook parts of the winder, respectively, can eliminate the necessity of fixing the winder to the container or the like, so that the winder can be easily arranged.

The winder may be an electric winder. Either a manual or electric winder may be used. However, winding operation using a manual winder may not be so easy in the case where the winder is designed to be used with the upper and lower hook parts engaged. Therefore, it is preferable to use an electric winder.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views.

DESCRIPTION OF THE EMBODIMENTS

Figure 1:
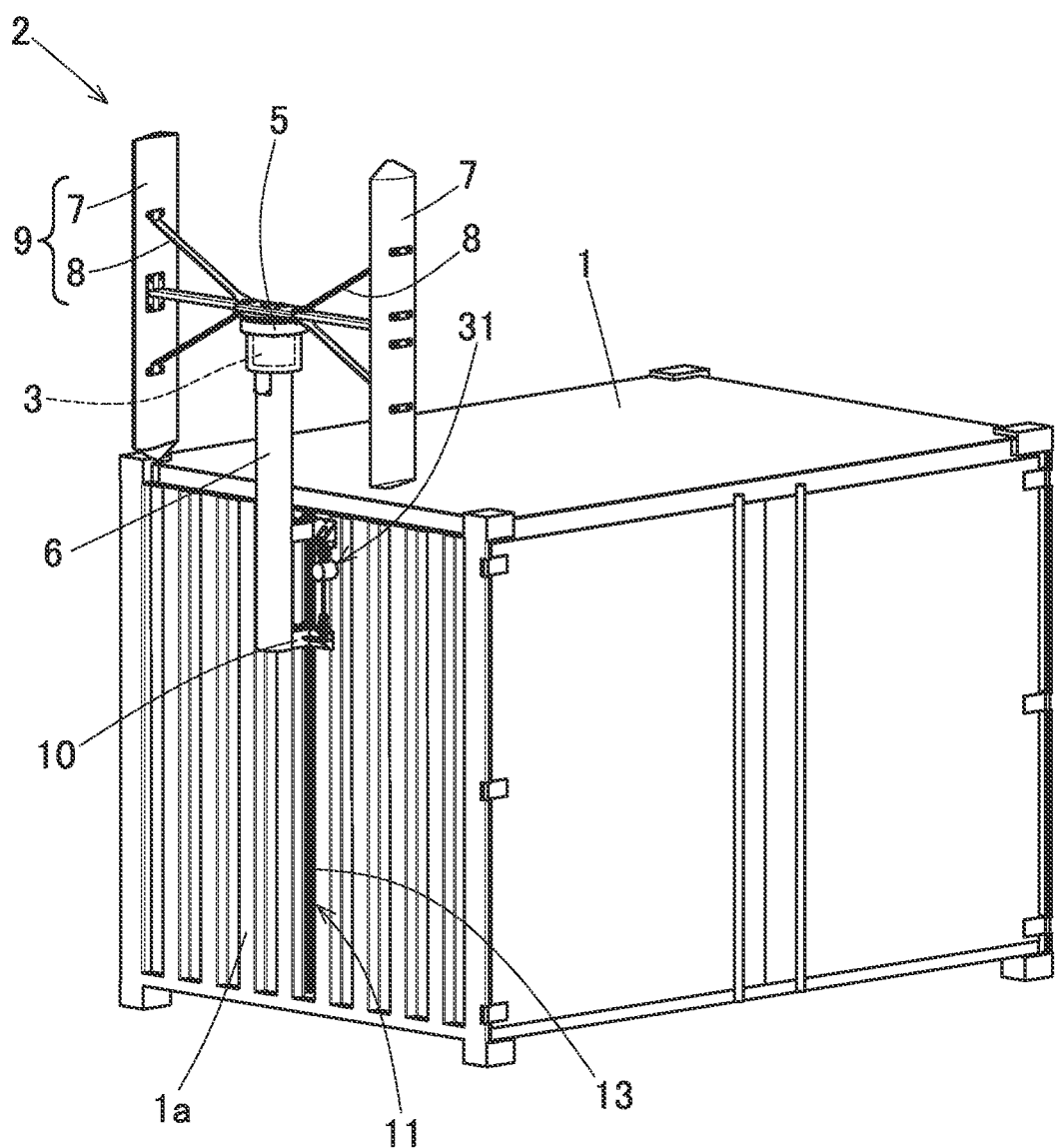
FIG. 1 is a perspective view showing a use state of a containerized mobile wind power generation apparatus according to one embodiment of the present invention.
Figure 2:
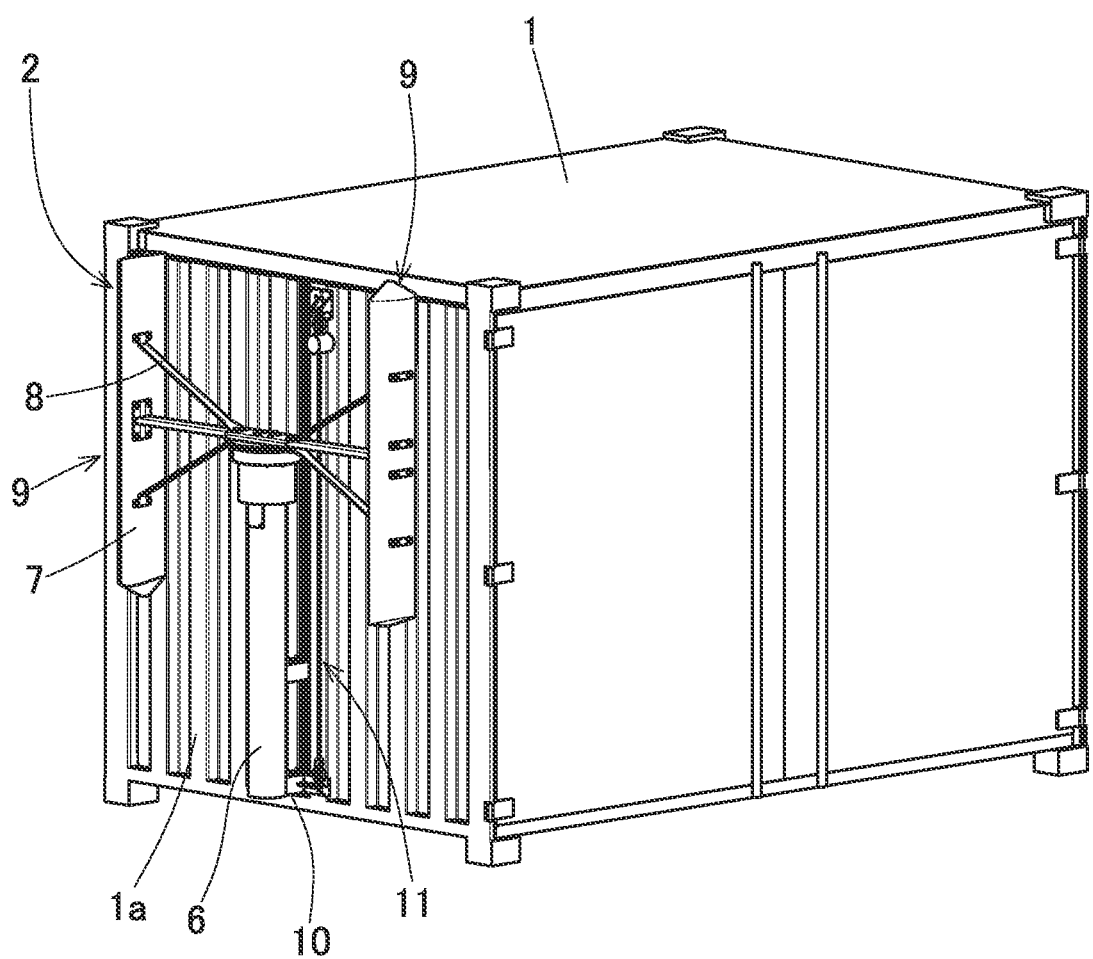
FIG. 2 is a perspective view showing a state of the containerized mobile wind power generation apparatus with the wind turbine lowered.
Figure 3:
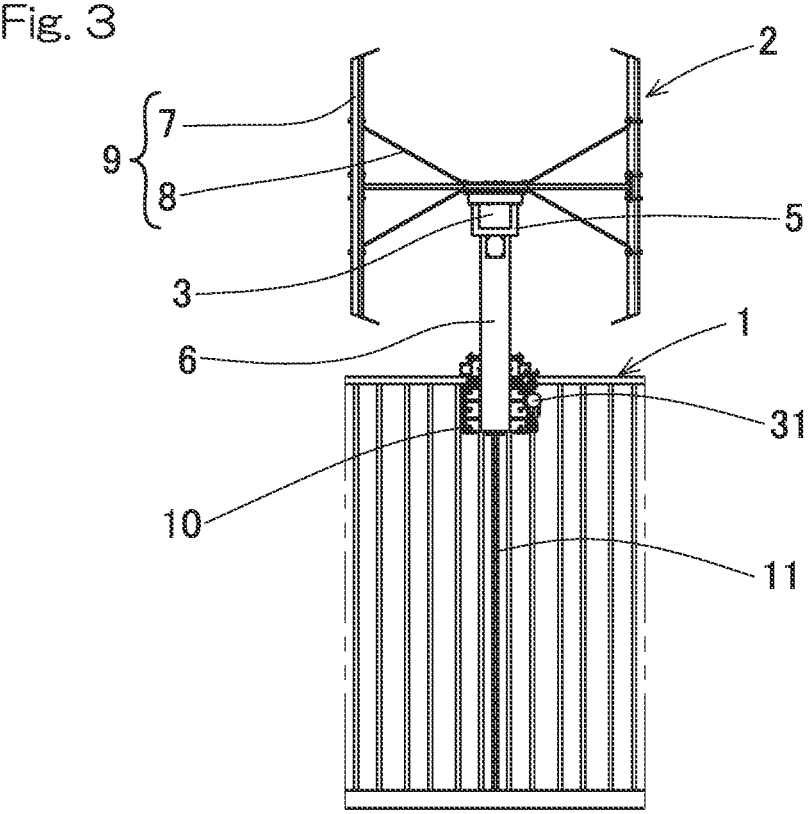
FIG. 3 is a front view showing a use state of the containerized mobile wind power generation apparatus.

A containerized mobile wind power generation apparatus according to one embodiment of the present invention is described with reference to FIG. 1 to FIG. 9. In FIG. 1, the containerized mobile wind power generation apparatus includes a container 1, a wind turbine 2 which can be housed in the container 1, and a generator 3 which is driven by the wind turbine 2 to generate power.

The container 1 has narrower dimensions than the standard dimensions, so that the container 1 can be carried by, for example, a general 4-ton truck. The container 1, however, may be a container having the standard dimensions for freight transport.

The wind turbine 2 is a vertical-axis wind turbine including a central rotary member 5 disposed in an upper part of a support column 6 in a rotatable manner about the vertical axis, a plurality of blades 7 extending vertically around the central rotary member 5 with coupling the blades 7 to the central rotary member 5 via arms 8. The plurality of blades 7 and the arms 8 constitute a rotary blade assembly 9. The central rotary member 5 may be the main shaft or the like. The support column 6 is formed from a round steel pipe or the like, and the central rotary member 5 of the wind turbine 2 is disposed at the upper end of the support column in a rotatable manner through a bearing (not illustrated). The generator 3 and the bearing are disposed inside the central rotary member 5 and are coupled thereto in such a way that rotation of the central rotary member 5 can be transferred to the rotor of the generator 3.

Figure 8:
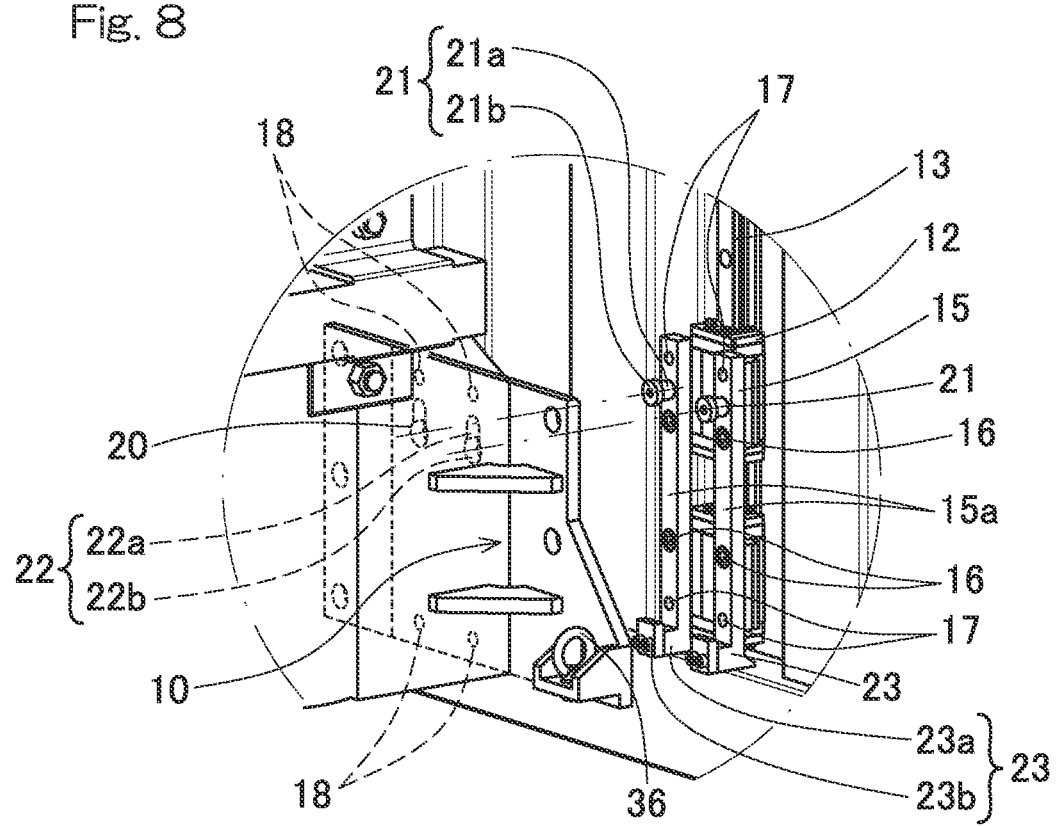
FIG. 8 is an exploded perspective view showing the same part of the containerized mobile wind power generation apparatus as the part shown in FIG. 6.

A linear-motion guiding device 11 is disposed on the wall 1a of one end of the container 1 along the vertical direction, and the wind turbine 2 is attached to a slider 12 (see FIG. 8) of the linear-motion guiding device 11 by a support-column lower end member 10 disposed at the lower end of the support column 6. The linear-motion guiding device 11 includes a rail 13 and the slider 12 that can slide vertically along the rail 13, as shown in FIG. 8 in a partly enlarged manner. The linear-motion guiding device 11 includes a linear rolling bearing in this embodiment and has, inside the slider 12, circulation paths (none illustrated) for moving a plurality of rolling elements (none illustrated) which roll on and contact with the rail 13, so that the rolling elements can circulate. There are a plurality of circulation paths, so that the rolling elements roll in the raceway grooves on the opposite side surfaces of the rail 13.

Figure 4:
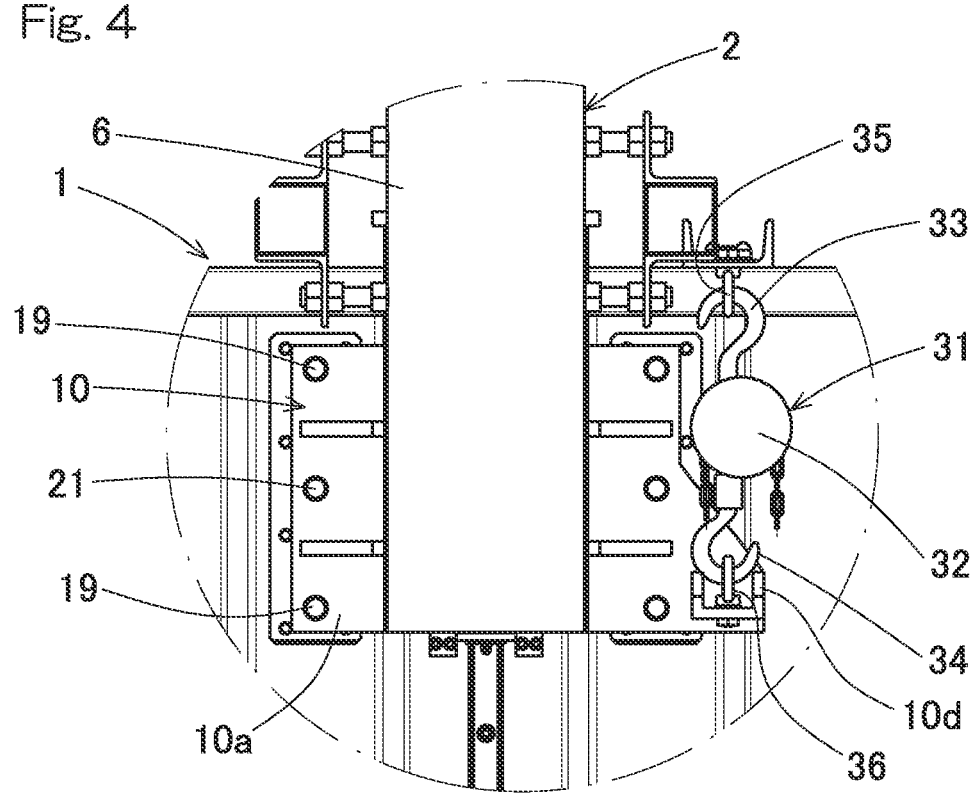
FIG. 4 is an enlarged front view showing a winder of the containerized mobile wind power generation apparatus and the surrounding part thereof.
Figure 5:
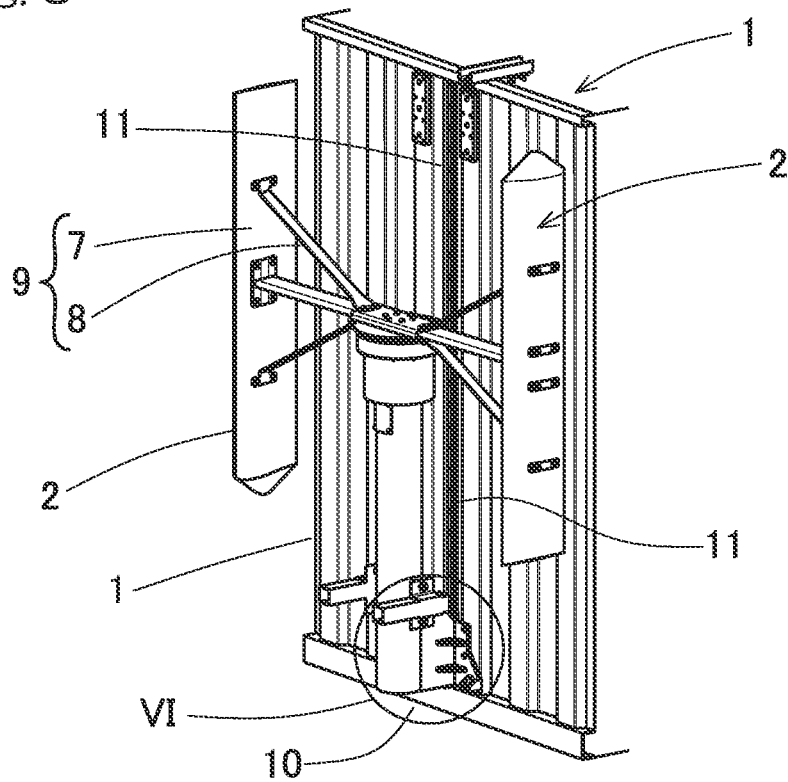
FIG. 5 is an enlarged perspective view showing a state of the container front part of the containerized mobile wind power generation apparatus with the wind turbine lowered.
Figure 6:
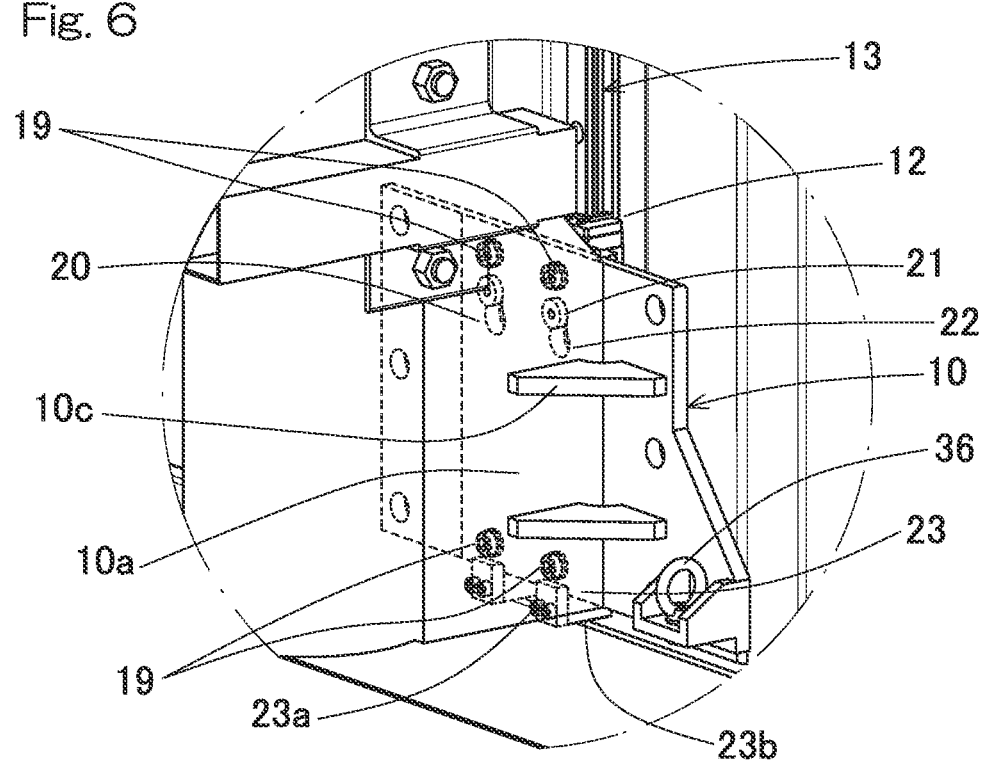
FIG. 6 is an enlarged perspective view showing part VI of FIG. 5.
Figure 7:
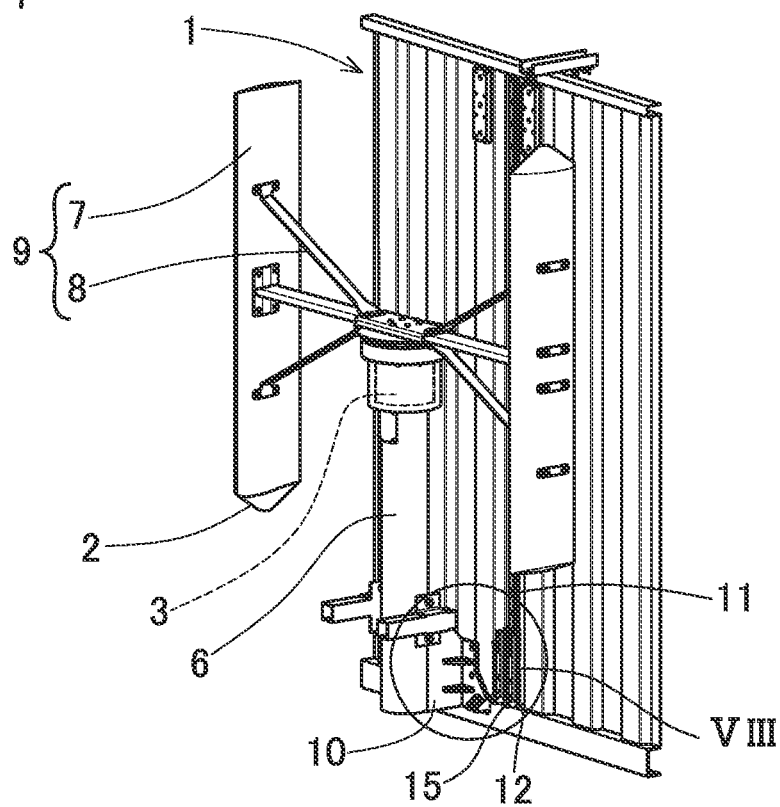
FIG. 7 is an exploded perspective view showing the same part of the containerized mobile wind power generation apparatus as the part shown in FIG. 5.

Vertical movement of the wind turbine 2 along the linear-motion guiding device 11 is enabled by a winder 31 shown in FIG. 4. The winder 31 is an electric winder in this embodiment. The winder 31 includes a winder case 32, a rotary drum disposed therein, wire members such as wire ropes extending vertically and wound around the rotary drum (none illustrated), and hooks 33, 34 provided to the ends of the upper and lower wire members, respectively. The rotary drum can be rotated backward and forward by a motor (not illustrated) disposed in the winder case 32 to wind or unwind, i.e., shorten or extend the distance between the upper and lower hooks 33, 34. The upper and lower wire members may be separate from each other or continuous as a single piece. One of the upper and lower hooks 33, 34 may be attached to the winder case 32. The upper and lower hooks 33, 34 of the winder 31 are hooked on upper and lower to-be-engaged parts 35, 36 provided to the upper part of the container 1 and to the support-column lower end member 10 of the wind turbine 2, respectively. The upper and lower to-be-engaged parts 35, 36 are formed by, for example, eyebolts.

As shown in FIG. 5 to FIG. 8, the wind turbine 2 is attached to the slider 12 of the linear-motion guiding device 11 in the following manner.

As shown in the exploded perspective view of FIG. 8, a guide member 15 is disposed on the front face of the slider 12. The guide member 15 includes, in this example, two parallel guide plates 15a in the form of thin plates extending in the direction of linear motion of the linear-motion guiding device 11. The guide member 15 is attached to the slider 12 by fasteners 16 such as bolts. The guide member 15 has threaded holes 17 at a plurality of positions. The threaded holes 17 may be formed by directly threading the guide member 15 or by welding nuts or the like. The support-column lower end member 10 has bolt insertion holes 18 corresponding to the threaded holes 17, and respective bolts 19 (FIG. 6, FIG. 9) inserted through the bolt insertion holes 18 are screwed into and fastened to the threaded holes 17 to fix the support-column lower end member 10 of the wind turbine 2 to the slider 12.

Figure 9:
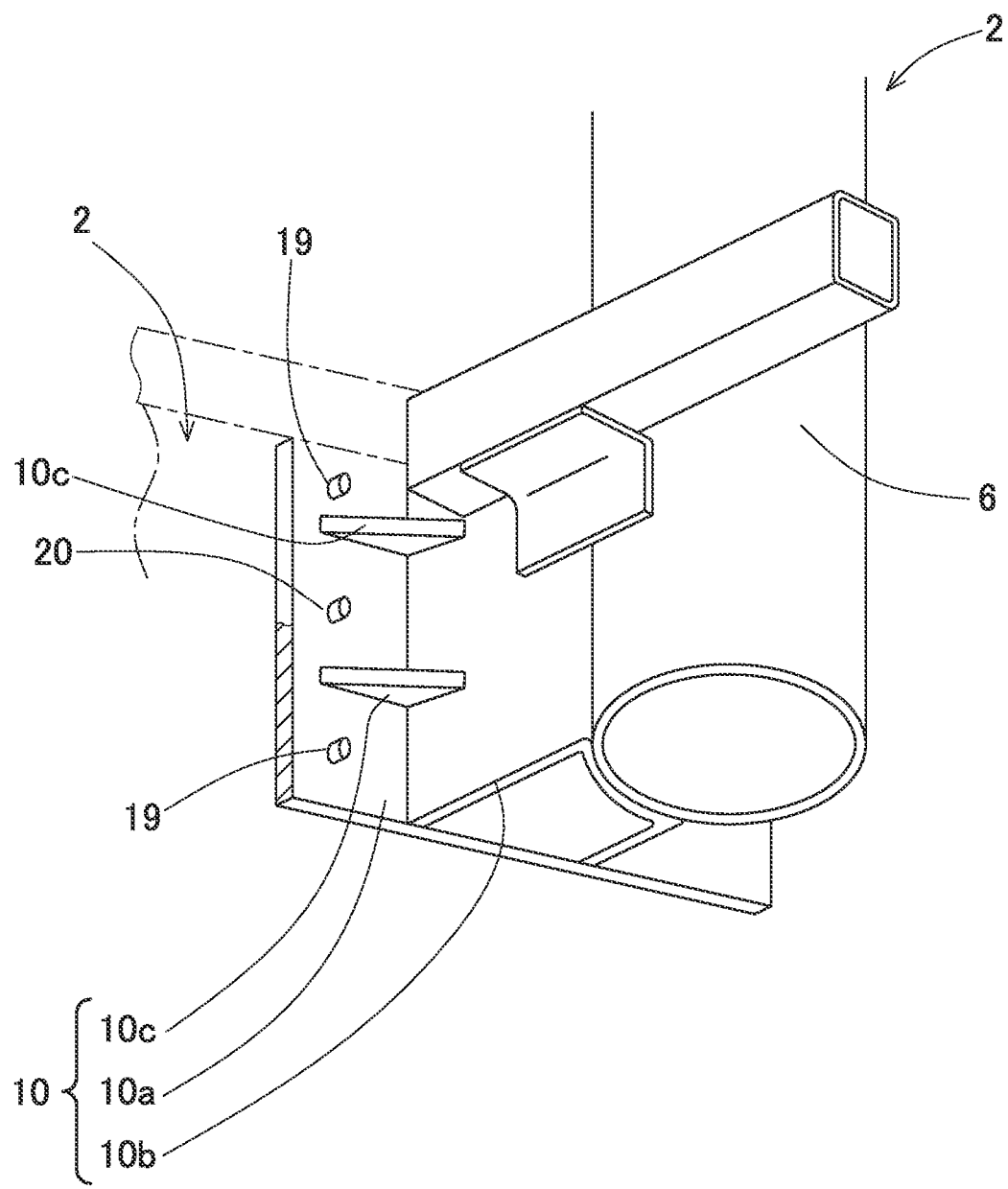
FIG. 9 is a bird's eye perspective view showing a support-column lower end member of the containerized mobile wind power generation apparatus and the surrounding part thereof.
Figure 10:
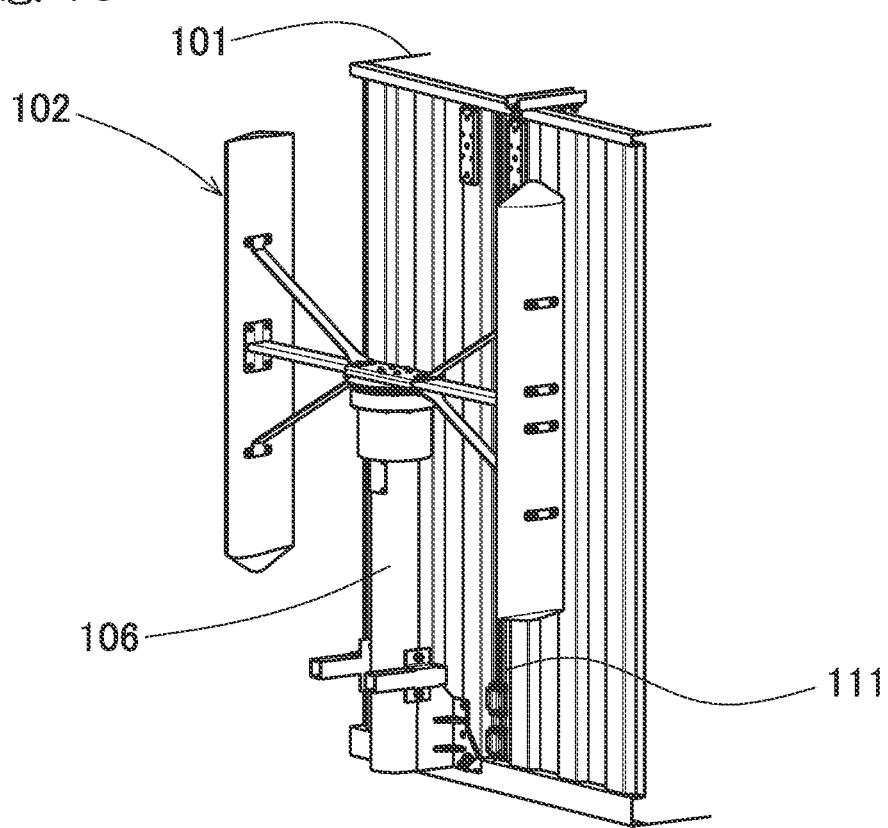
FIG. 10 is a front view showing a state of the container front part of a containerized mobile wind power generation apparatus according to a proposed example, with the wind turbine lowered.
Figure 11:
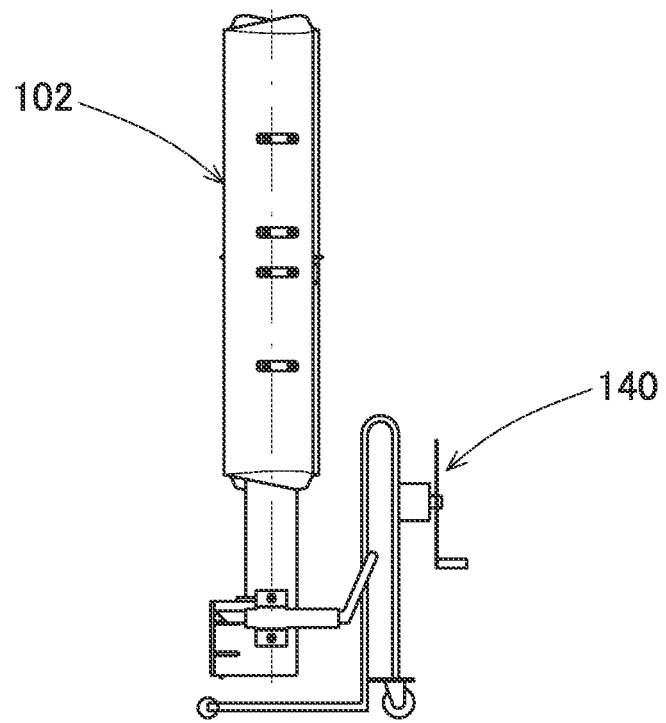
FIG. 11 is a side view of a manual lift of the containerized mobile wind power generation apparatus according to the proposed example.
Figure 12:
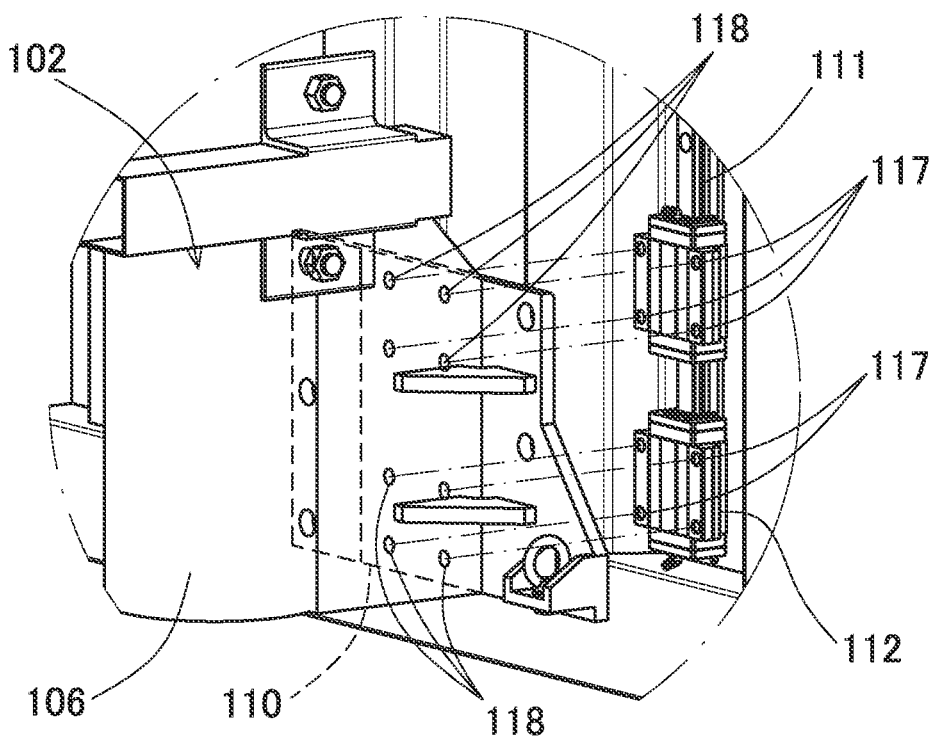
FIG. 12 is a perspective view showing a fixing structure for the lower part of the wind turbine support column of the containerized mobile wind power generation apparatus according to the proposed example.

The support-column lower end member 10 includes, for example, as shown in e.g. FIG. 9, a base plate part 10a, a support-column joining plate part 10b protruding from the base plate part 10a toward the support column 6, and reinforcing plate parts 10c which are respective two parts joined adjacent to the base plate part 10a and the support-column joining plate part 10b. The support-column joining plate part 10b shown in FIG. 9 is omitted in FIG. 6 and FIG. 8. For the sake of expedience, the drawings in FIG. 6 and FIG. 8 have different dimensional relations from that of the drawing in FIG. 9. The support-column lower end member 10 includes, at the lower part thereof, a protruding part 10d to which the lower to-be-engaged part 36 is attached. Illustration of the protruding part 10d is omitted in FIG. 9.

In order to facilitate the operation of screwing the bolts 19, an attachment guide part 20 is provided. The attachment guide part 20 is a part for guiding the support-column lower end member 10 to a position and an attitude in which the bolt insertion holes 18 of the support-column lower end member 10 are aligned with the threaded holes 17 of the guide member 20 when the support-column lower end member 10 is not fixed to the slider 12.

The attachment guide part 20 includes a plurality of stepped bolts 21, a plurality of hook slots 22, and one flanged step part 23. Each stepped bolt 21 includes a shaft part 21a and a head part 21b having a larger diameter than that of the shaft part 21a. The hook slots 22 are formed in the support-column lower end member 10. Each hook slot has, in the lower part thereof, a large diameter part 22b through which the head part 21b of a stepped bolt 21 can pass and, in the upper part thereof, a narrow part having a width that permits the shaft part 21a of the stepped bolt 21 to pass through but does not permit the head part 21b to pass through. Each hook slot 22 has a so-called keyhole like shape. The flanged step part 23 includes a receiving part 23a for receiving the lower face of the support-column lower end member 10 and a flange part 23b extending upward from the end of the receiving part 23a opposite from the container so as to engage with the side face of the support-column lower end member 10 opposite from the container.

According to the configuration of this embodiment, the wind turbine 2 received in the container 1 can be more easily set up, so that power demand can be immediately met even in areas affected by disasters or the like. This containerized mobile wind power generation apparatus includes a linear-motion guiding device 11 disposed on the wall of the container 1, the linear-motion guiding device including the slider 12 which can be moved vertically. And the wind turbine 2 can be moved vertically along with the slider 12 with the support-column lower end member 10 at the lower end of the support column 6 fixed to the slider 12, and the wind turbine 2 can be fixed to the slider 12 by inserting the bolts 19 (FIG. 6) through the bolt insertion holes 18 (FIG. 8) in the support-column lower end member 10 and screwing the bolts into threaded holes 17 (FIG. 8) in the guide member 15. Thus, installation operation is facilitated.

In particular, the linear-motion guiding device 11 is provided with the attachment guide part 20 in order to facilitate attachment of the wind turbine 2 to the linear-motion guiding device 11. The attachment guide part 20 includes the stepped bolts 21 and the flanged step part 23 for receiving the wind turbine 2. The attachment guide part also includes, on the side facing toward the wind turbine 2, the keyhole-like-shaped hook slots 22 for hooking on the stepped bolts 21. Thus, on attaching the wind turbine 2 to the linear-motion guiding device 11, the wind turbine 2 can be hooked on the stepped bolts 21 and temporarily placed on the flanged step part 23 of the attachment guide part 20, so that the wind turbine 2 can be brought upright and the threaded holes 17 are aligned. In this way, the wind turbine can be fixed with bolts very easily.

Furthermore, even on lifting the wind turbine 2 using the winder 31 (FIG. 4) to the upper end as shown in FIG. 9 and fixing it to the container 1 with bolts, the wind turbine 2 is set upright by the attachment guide part 20, so that the threaded holes are aligned. In this way, the wind turbine can be fixed with bolts very easily.

Although the present invention has been described in terms of the preferred embodiments thereof with reference to the drawings, various additions, modifications, or deletions may be made without departing from the scope of the invention. Accordingly, such variants are included within the scope of the present invention.

REFERENCE NUMERALS

1 . . . container
2 . . . wind turbine
3 . . . generator
6 . . . support column
9 . . . rotary blade assembly
10 . . . support-column lower end member
11 . . . linear-motion guiding device
12 . . . slider
13 . . . rail
15 . . . guide member
15a, 15a . . . guide plate
17 . . . threaded hole
18 . . . bolt insertion hole
19 . . . bolt
20 . . . attachment guide part
21 . . . stepped bolt
21a . . . shaft part
21b . . . head part
22 . . . hook slot
23 . . . flanged step part
23a . . . receiving part
23b . . . flange part
31 . . . winder
33, 34 . . . hook
35, 36 . . . to-be-engaged part

What is claimed is:

1. A containerized mobile wind power generation apparatus comprising:
a container;
a wind turbine capable of being housed in the container; and
a generator configured to be driven by the wind turbine to generate power,
the containerized mobile wind power generation apparatus further comprising a linear-motion guiding device disposed on a wall of the container, the linear-motion guiding device including a slider configured to be moved vertically,
wherein the wind turbine includes a rotary blade assembly disposed at an upper end of a support column, and a support-column lower end member disposed at a lower end of the support column and configured to be fixed to the slider, and the wind turbine is configured to be moved vertically along with the slider when the support-column lower end member is fixed to the slider,
the slider is provided with a guide member, and the wind turbine is configured to be fixed to the slider by inserting a bolt through a bolt insertion hole in the support-column lower end member and screwing the bolt into a threaded hole in the guide member, and
the containerized mobile wind power generation apparatus includes an attachment guide part configured to engage with the support-column lower end member to thereby guide the support-column lower end member to a position and turn the support-column lower end member toward a direction, the position and the direction being such that the bolt insertion hole in the support-column lower end member is aligned with the threaded hole in the guide member, when the support-column lower end member is not fixed to the slider.

2. The containerized mobile wind power generation apparatus as claimed in claim 1, wherein the attachment guide part includes:
- a stepped bolt including a shaft part and a head part having a larger diameter than that of the shaft part;
- a hook slot provided in the support-column lower end member, the hook slot having, in a lower part thereof, a large diameter part through which the head part of the stepped bolt is configured to pass and, in an upper part thereof,
- a narrow part having a width that permits the shaft part of the stepped bolt to pass through but does not permit the head part to pass through; and
- a flanged step part including a receiving part configured to receive a lower face of the support-column lower end member and a flange part extending upward from an end of the receiving part opposite from the container so as to engage with a side face of the support-column lower end member opposite from the container.

3. The containerized mobile wind power generation apparatus as claimed in claim 1, wherein the wind turbine is a vertical wind turbine including a central rotary member disposed so as to be rotatable about a vertical axis and a plurality of blades extending vertically around the central rotary member.

4. The containerized mobile wind power generation apparatus as claimed in claim 1, comprising
- upper and lower to-be-engaged parts in an upper part of the container and a lower part of the support column of the wind turbine, respectively, and
- a winder including upper and lower hook parts configured to be engaged with the upper and lower to-be-engaged parts, respectively, and change a distance between the upper and lower hook parts.

5. The containerized mobile wind power generation apparatus as claimed in claim 4, wherein the winder is an electric winder.

* * * * *